(12) United States Patent
Neven, Sr. et al.

(10) Patent No.: US 7,565,139 B2
(45) Date of Patent: Jul. 21, 2009

(54) IMAGE-BASED SEARCH ENGINE FOR MOBILE PHONES WITH CAMERA

(75) Inventors: Hartmut Neven, Sr., Aachen (DE); Hartmut Neven, Malibu, CA (US)

(73) Assignee: Google Inc., Mountain View, CA (US)

( * ) Notice: Subject to any disclaimer, the term of this patent is extended or adjusted under 35 U.S.C. 154(b) by 391 days.

(21) Appl. No.: 11/129,034

(22) Filed: May 13, 2005

(65) Prior Publication Data

US 2006/0012677 A1    Jan. 19, 2006

Related U.S. Application Data

(63) Continuation-in-part of application No. 10/783,378, filed on Feb. 20, 2004.

(60) Provisional application No. 60/570,924, filed on May 13, 2004.

(51) Int. Cl.
*H04L 29/06* (2006.01)

(52) U.S. Cl. ............. 455/414.3; 455/414.1; 455/414.2; 455/414.4; 455/3.01; 455/3.05; 455/3.06; 455/556.1; 455/556.2; 707/3; 707/4; 707/5; 707/7; 707/10; 707/104.1; 707/204

(58) Field of Classification Search .......... 455/414.1–4, 455/418–420, 458, 550.1, 556.1–2, 3.01–3.06; 382/118, 182, 229, 181; 707/104.1, 3–10, 707/200–204; 348/14.01–14.02; 345/418–419
See application file for complete search history.

(56) References Cited

U.S. PATENT DOCUMENTS 5,884,247 A    3/1999    Christy
6,023,241 A    2/2000    Clapper
6,148,105 A    11/2000   Wakisaka et al.
6,208,626 B1   3/2001    Brewer
6,272,231 B1   8/2001    Maurer et al.

(Continued)

FOREIGN PATENT DOCUMENTS

DE    10103922 A1    8/2002

(Continued)

OTHER PUBLICATIONS

Beis et al., "Shape indexing Using Approximate Nearest-Neighbour Search in High-Dimensional Spaces", CVPR '97, 1997, 7 pages.

(Continued)

*Primary Examiner*—Tuan A Tran
(74) *Attorney, Agent, or Firm*—Fenwick & West LLP

(57) ABSTRACT

An image-based information retrieval system is disclosed that includes a mobile telephone and a remote server. The mobile telephone has a built-in camera and a communication link for transmitting an image from the built-in camera to the remote server. The remote server has an optical character recognition engine for generating a first confidence value based on an image from the mobile telephone, an object recognition engine for generating a second confidence value based on an image from the mobile telephone, a face recognition engine for generating a third confidence value based on an image from the mobile telephone, and an integrator module for receiving the first, second, and third confidence values and generating a recognition output.

20 Claims, 2 Drawing Sheets

U.S. PATENT DOCUMENTS

| | | |
|---|---|---|
| 6,301,370 B1 | 10/2001 | Steffens et al. |
| 6,470,264 B2 | 10/2002 | Bide |
| 6,504,571 B1 | 1/2003 | Narayanaswami et al. |
| 2001/0032070 A1 | 10/2001 | Teicher |
| 2002/0101568 A1 | 8/2002 | Eberl et al. |
| 2002/0184203 A1 | 12/2002 | Nastar et al. |
| 2002/0187774 A1 | 12/2002 | Ritter et al. |
| 2003/0044608 A1* | 3/2003 | Yoshizawa et al. .......... 428/398 |
| 2003/0164819 A1 | 9/2003 | Waibel |
| 2003/0198368 A1* | 10/2003 | Kee ............................ 382/118 |
| 2004/0004616 A1* | 1/2004 | Konya et al. ................. 345/419 |
| 2005/0041862 A1* | 2/2005 | Lo .............................. 382/181 |
| 2005/0185060 A1 | 8/2005 | Neven |
| 2006/0012677 A1 | 1/2006 | Neven et al. |
| 2006/0026202 A1* | 2/2006 | Isberg et al. ............. 707/104.1 |

FOREIGN PATENT DOCUMENTS

| | | |
|---|---|---|
| DE | 10110979 A1 | 9/2002 |
| DE | 10245900 A1 | 4/2004 |
| EP | 0944019 A2 | 9/1999 |
| EP | 0944019 A3 | 9/2001 |
| JP | 2002-278670 A | 9/2002 |
| WO | WO 98/47104 A1 | 10/1998 |
| WO | WO 01/04790 A1 | 1/2001 |
| WO | WO 01/86613 A2 | 11/2001 |
| WO | WO 03/001435 A1 | 1/2003 |
| WO | WO 03/041000 A1 | 5/2003 |
| WO | WO 2004/038613 A1 | 5/2004 |
| WO | WO 2005/114476 A1 | 12/2005 |

OTHER PUBLICATIONS

Kovesi, "Image features from phase congruency", Videre: Journal of Computer Vision Research, pp. 1-27, 1999, vol. 1, No. 3, MIT Press.

Fei-Fei, et al., "Learning Generative Visual Models from Few Training Examples: An Incremental Bayesian Approach Tested on 101 Object Cat.", pp. 1-9, GMBV04, 2004.

Lowe, "Object recognition from Local Scale-Invariant Features.", Proc. ICCV, Sep. 1999, pp. 1150-1157.

Okada et al., "The Bochum/USC Face Recognition System . . . ", Published in Face Recognition: From Theory to Applications, 1998, pp. 186-205. Springer-Verlag.

Lakshmi, "Cell Phones, Billboards Play Tag", Jul. 10, 2003, 3 pages, www.wired.com.

Takeuchi et al., "Evaluation of Image-Based Landmark Recognition Techniques", Jul. 1998, pp. 1-16, The Robotics Institute, Carnegie Mellon University.

Viola et al., "Rapid object detection using a boosted cascade of simple features", Proc. of IEEE Conf. on Computer Vision and Pattern Rec., Dec. 2001, pp. 1-9.

Yang et al., "Smart Sight: A Tourist Assistant System", 3rd Int'l Symposium on Wearable Computers , Oct. 1999, pp. 73-78.

Yang et al., "Towards Automatic Sign Translation", Proc. of the Human Language Technology Meeting (HLT-2001), Mar. 2001, 6 pages.

Yang et al., "An Automatic Sign Recognition and Translation System", Workshop on Perceptive User Interfaces (PUI'01), Nov. 2001, 8 pages.

Zhang et al., "A PDA-based Sign Translator", Proceeding, Foruth IEEE International Conference, Oct. 14, 2002, pp. 217-222.

Wiskott, L., et al., "Face Recognition by Elastic Bunch Graph Matching," IEEE Transactions on Pattern Analysis and Machine Intelligence, Jul. 1997, pp. 775-779, vol. 19, No. 7.

PCT International Search Report and Written Opinion, PCT/US2005/016776, Aug. 23, 2005, 11 pages.

* cited by examiner

IMAGE-BASED SEARCH ENGINE FOR MOBILE PHONES WITH CAMERA

This application is a continuation-in-part of U.S. application Ser. No. 10/783,378, filed Feb. 20, 2004, herein incorporated by reference. This application claims the benefit of U.S. Provisional Application No. 60/570,924, filed May 13, 2004, herein incorporated by reference.

BACKGROUND OF THE INVENTION

The present invention relates to a mobile image-based retrieval system, and more particularly, to a system including a mobile phone with a built-in camera for use in image-based searching.

Mobile phones having a camera are proliferating at a rapid pace. Driven through the low cost of cameras, the percentage of camera phones of all mobile phones is rapidly increasing as well. The expectation is that in a few years, on the order of one billion mobile handsets with cameras will be in use worldwide.

Accordingly, there exists a need for more effective use of the facilities provided by a mobile camera phone. The present invention satisfies this need.

SUMMARY OF THE INVENTION

The present invention may be embodied in an image-based information retrieval system that includes a mobile telephone and a remote server. The mobile telephone has a built-in camera, a recognition engine for recognizing an object or feature in an image from the built-in camera, and a communication link for requesting information from the remote server related to a recognized object or feature.

In more detailed features of the invention, the object may be an advertising billboard and the related information may be a web page address. Alternatively, the object may be a car and the related information may be a car manual. Also, the object may be a product and the related information may be a payment confirmation. Further, the object may be a book and the related information may be an audio stream.

In other more detailed features of the invention, the object feature may text and the related information may be a translation of the text or a web page address. Similarly, the object feature may be an advertisement and the related information may be a web page address. Also, the object feature may be a picture and the related information may be an audio stream.

Alternatively, the present invention may be embodied an image-based information retrieval system that includes a mobile telephone and a remote server. The mobile telephone has a built-in camera and a communication link for transmitting an image from the built-in camera to the remote server. The remote server has an optical character recognition engine for generating a first confidence value based on an image from the mobile telephone, an object recognition engine for generating a second confidence value based on an image from the mobile telephone, a face recognition engine for generating a third confidence value based on an image from the mobile telephone, and an integrator module for receiving the first, second, and third confidence values and generating a recognition output.

In more detailed features of the invention, the object recognition engine may comprise a rigid texture object recognition engine, and/or an articulate object recognition engine.

BRIEF DESCRIPTION OF THE DRAWINGS

The accompanying drawings illustrate embodiments of the present invention and, together with the description, serve to explain the principles of the invention.

DETAILED DESCRIPTION

The features described herein will make the Image-based Search Engine for Mobile Phones with Camera more efficient and better suited for a commercial use. Specifically, this application addresses improvements to four aspects of an image-based search service: 1) improvement to the client side application that resides on the mobile handset; 2) server side innovations that make the image search faster and more focused on relevant parts of the image databases; 3) new applications; and 4) business models that are particularly suited for a commercial roll-out of an image-based search service.

1. Client Side 1.1 Feature Extraction on the Client Side

The simplest implementation of a search engine is one in which the recognition engine resides entirely on the server. However for a couple of reasons it might be more desirable to run part of the recognition on the phone. One reason is that this way the server has less computational load and the service can be run more economically. The second reason is that the feature vectors contain less data then the original image thus the data that needs to be send to the server can be reduced.

1.2 Image Region Delivery on Demand

To recognize an object in a reliable manner sufficient image detail needs to be provided. In order to strike a good balance between the desire for a low bandwidth and a sufficiently high image resolution one can use a method in which a lower resolution representation of the image is send first. If necessary and if the object recognition engines discover a relevant area that matches well one of the existing object representations one can transmit additional detail.

1.3 Over the Air Download

For a fast proliferation of the search service it will be important to allow a download over the air of the client application. The client side application would essentially acquire an image and send appropriate image representations to recognition servers. It then would receive the search results in an appropriate format. Advantageously, such an application would be implemented in Java or BREW so that it is possible to download this application over the air instead of preloading it on the phone.

1.4 Reducing the Search Through Extra Input

Often it will be helpful to provide additional input to limit the image-based search to specific domains such as "travel guide" or "English dictionary". External input to confine the search to specific domains can come from a variety of sources. One is of course text input via typing or choosing from a menu of options. Another one is input via Bluetooth or other signals emitted from the environment. A good example for the later might be a car manual. While the user is close to the car for which the manual is available a signal is transmitted from the car to his mobile device that allows the search engine to offer a specific search tailored to car details. Finally a previous successful search can cause the search engine to narrow down search for a subsequent search.

Figure 2:
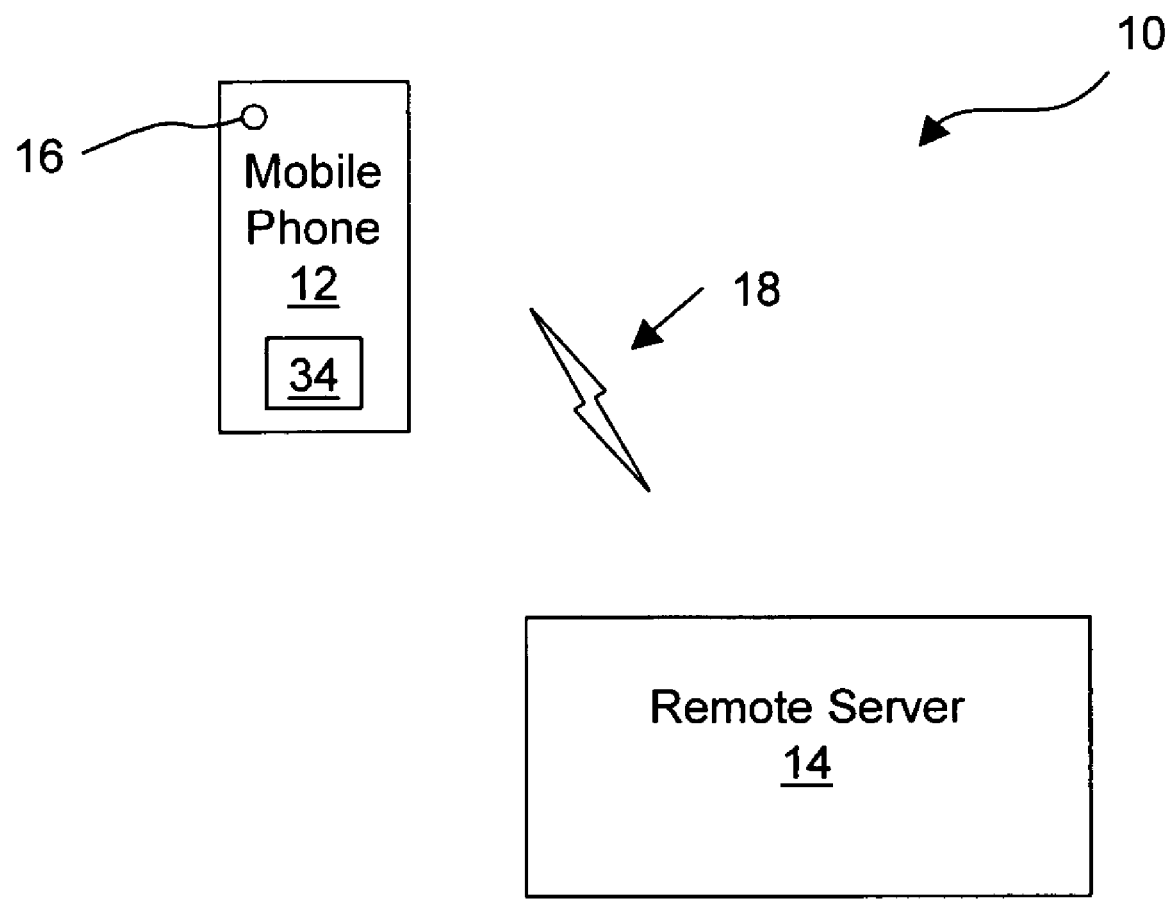
FIG. 2 is a block diagram of an image-based information retrieval system that includes a mobile telephone having a recognition engine for recognizing an object in an image from a built-in camera.

Accordingly, with reference to FIG. 2, the present invention may be embodied in an image-based information retrieval system 10 including a mobile telephone 12 and a remote server 14. The mobile telephone has a built-in camera 16, a recognition engine 32 for recognizing an object or feature in an image from the built-in camera, and a communication link 18 for requesting information from the remote server related to a recognized object or feature.

2. Server Side 2.1 Multiple Engines on the Remote Server

Years of experience in machine vision have shown that it is very difficult to design a recognition engine that is equally well suited for diverse recognition tasks. For instance, engines exist that are well suited to recognize well textured rigid objects. Other engines are useful to recognize deformable objects such as faces or articulate objects such as persons. Yet other engines are well suited for optical character recognition. To implement an effective vision-based search engine it will be important to combine multiple algorithms in one recognition engine or alternatively install multiple specialized recognition engines that analyze the query images with respect to different objects.

Advantageously, an architecture may be used in which multiple recognition engines are applied to an incoming image. Each engine returns the recognition results with confidence values and an integrating module that outputs a final list of objects recognized.

Figure 1:
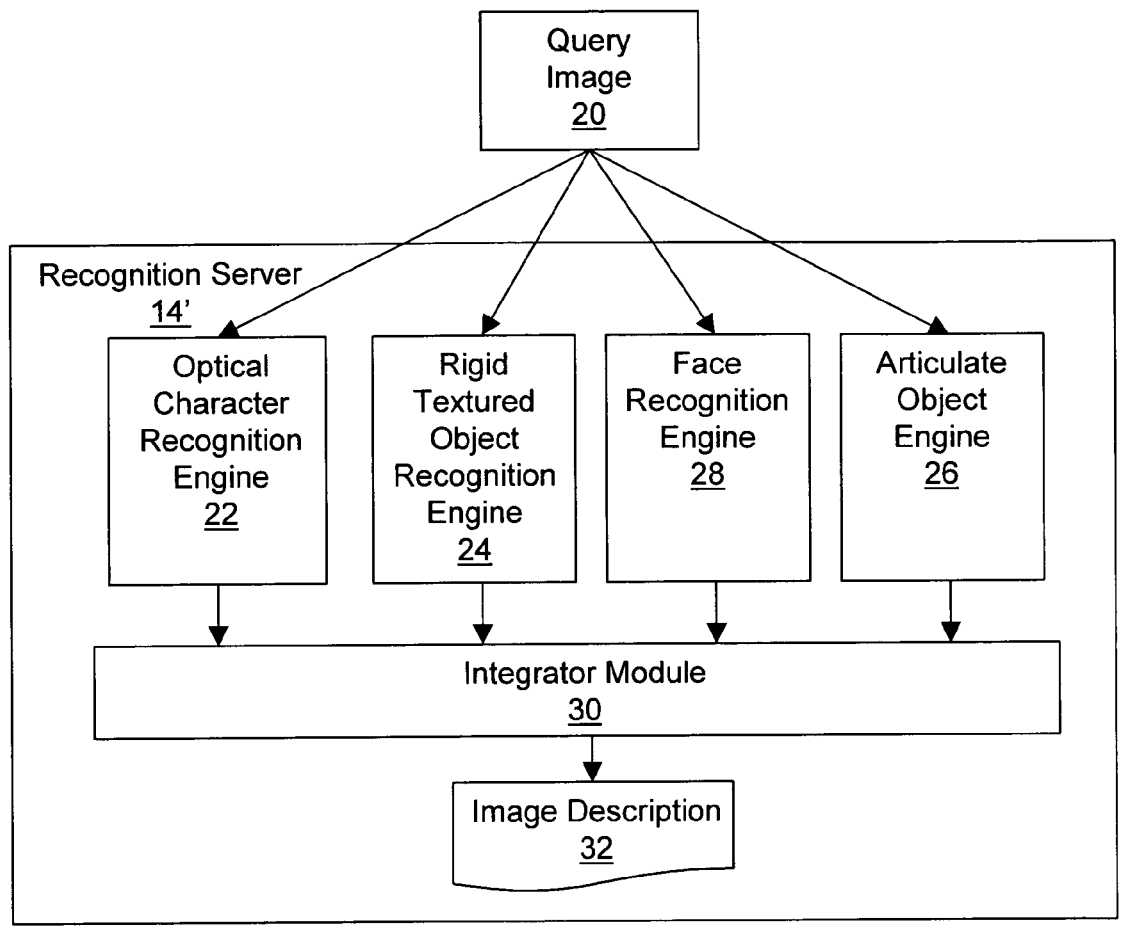
FIG. 1 is a block diagram illustrating a first embodiment of an image-based information retrieval system that includes a mobile telephone and a remote server with multiple recognition engines.

FIG. 1 shows an effective recognition server 14' that is comprised of multiple specialized recognition engines that focus on recognizing certain object classes.

Accordingly, with reference to FIGS. 1 and 2, the present invention may be embodied in an image-based information retrieval system that includes a mobile telephone 12 and a remote recognition server 14'. The mobile telephone has a built-in camera 16 and a communication link 18 for transmitting an image 20 from the built-in camera to the remote recognition server. The remote recognition server has an optical character recognition engine 22 for generating a first confidence value based on an image from the mobile telephone, an object recognition engine, 24 and/or 26, for generating a second confidence value based on an image from the mobile telephone, a face recognition engine 28 for generating a third confidence value based on an image from the mobile telephone, and an integrator module 30 for receiving the first, second, and third confidence values and generating a recognition output. The recognition output may be an image description 32.

2.2 Maintaining the Image Data Base

Objects change. Therefore it is important to regularly update the object representations. This can be achieved in two ways. One way is that the service providers regularly add current image material to refresh the object representations. The other way is to keep the images that user submit for query and upon recognition feed them into the engine that updates the object representations. The later method requires a confidence measure that estimates how reliable a recognition result is. This is necessary in order not to pollute the database. There are different ways to generate such a confidence measure. One is to use match scores, topological and other consistency checks that are intrinsic the object recognition methods described in the previous disclosure as well the one cited below. Another way is to rely on extrinsic quality measures such as to determine whether a search result was accepted by a user. This can with some reliability be inferred from whether he continued using the page to which the search result led and/or whether he did not do a similar query shortly after.

2.2.1 User Submitted Entries into the Library

One of the most important features of an image-based search service is that it is possible for a user, who is not a machine vision expert, to easily submit entries to the library of objects that can be recognized.

Using recognition methods such as the one described by David Lowe which is based on SIFT features essentially allows to recognize an object based on a single picture (David G. Lowe, Object recognition from local scale-invariant features, International Conference on Computer Vision, Corfu, Greece (September 1999), pp. 1150-1157).

A face recognition engine described in (U.S. Pat. No. 6,301,370 FACE RECOGNITION FROM VIDEO IMAGES) also allows to add new entries into the library using small sets of facial images. This system can be generalized to work with other object classes as well.

2.3 Databases that Sort the Available Images by Location, Time and Context

To facilitate the recognition it is important to cut down the number of object representations against which the incoming image has to be compared. Often one has access to other information in relation to the image itself. Such information can include time, location of the handset, user profile or recent phone transactions. Another source of external image information is additional inputs provided by the user.

It will be very beneficial to make use of this information. For instance, if one attempts to get information about a hotel by taking a picture of its facade and knows it is 10 pm in the evening, then it will increase the likelihood of correct recognition if one selects from the available hotel images those that have been taken close to 10 pm. The main reason is that the illumination conditions are likely to more similar.

Location information can also be used in obvious ways. Staying with the hotel example, one would arrange the search process such that only object representations of hotels are activated in the query of hotels that are close to the current location of the user.

Overall it seems that it will be helpful to organize the image search such that objects are looked up in a sequence in which object representations close in time and space will be search before object representations that are older or carry a location label further away are considered.

2.4 Logarithmic Search Strategy

An efficient implementation of a search service requires that the image search is organized such that it scales logarithmically with the number of entries in the database. This can be achieved by conducting a coarse-to-fine simple to complex search strategy such as described in (Shape Indexing Using Approximate Nearest-Neighbour Search in High-Dimensional Spaces, Jeffrey S. Beis and David G. Lowe, CVPR 1997). The principal idea is to do the search in an iterative fashion starting with a reduced representation that contains only the most salient object characteristics. Only matches that result from this first pass are investigated closer by using a richer representation of the image and the object. Typically this search proceeds in a couple of rounds until a sufficiently good match using the most complete image and object representation is found.

To cut down the search times further we also propose to employ color histograms and texture descriptors such as those proposed under the MPEG7 standard. These image descriptors can be computed very rapidly and help to readily identify subsets of relevant objects. For instance a printed text tends to generate characteristic color histograms and shape descriptors. Thus it might be useful to limit the initial search to character recognition if those descriptors lie within a certain range.

3. Application Level

3.1 Optical Character Recognition with Language Translation

A specific application of the image-based search engine is recognition of words in a printed document. The optical character recognition sub-engine can recognize a word which then can be handed to an encyclopedia or dictionary. In case the word is from a different language than the user's preferred language a dictionary look-up can translate the word before it is processed further.

3.2 Mobile Advertising

A sweet spot for a first commercial roll-out is mobile advertising. A user can send a picture of a product to a server that recognizes the product and associates the input with the user. As a result the sender could be entered into a sweepstake or he could receive a rebate. He could also be guided to a relevant webpage that will give him more product information or would allow him to order this or similar products.

3.3 Print-to-internet

A very useful application of image-based search is in the print-to-internet space. By submitting a picture showing a portion of a printed page to a server a user can retrieve additional, real-time information about the text. Thus together with the publishing of the newspaper, magazine or book it will be necessary to submit digital pictures of the pages to the recognition servers so that each part of the printed material can be annotated. Since today's printing process in large parts starts from digital versions of the printed pages this image material is readily available. In fact it will allow using printed pages in whole new ways as now they could be viewed as mere pointers to more information that is available digitally.

A special application is an ad-to-phone number feature that allows a user to quickly input a phone number into his phone by taking a picture of an ad. Of course a similar mechanism would of useful for other contact information such as email, SMS or web addresses.

3.4 Payment System

Image recognition can also be beneficially integrated with a payment system. When browsing merchandise a customer can take a picture of the merchandise itself, of an attached barcode, of a label or some other unique marker and send it to the server on which the recognition engine resides. The recognition results in an identifier of the merchandize that can be used in conjunction with user information, such as his credit card number to generate a payment. A record of the purchase transaction can be made available to a human or machine-based controller to check whether the merchandise was properly paid.

3.5 Learning Tool for Children

A group of users in constant need for additional explanations are children. Numerous educational games can be based on the ability to recognize objects. For example one can train the recognition system to know all countries on a world map. Other useful examples would be numbers or letters, parts of the body etc. Essentially a child could read a picture book just by herself by clicking on the various pictures and listen to audio streams triggered by the outputs of the recognition engine.

3.6 Treasure Hunt Games

Object recognition on mobile phones can support a new form of games. For instance a treasure hunt game in which the player has to find a certain scene or object say the facade of a building. Once he takes the picture of the correct object he gets instructions how to continue.

3.7 Virtual Annotation

A user can also choose to use the object recognition system in order to annotate objects. A user can take a photo of an object and submit it to the database together with a textual annotation that he can retrieve later when taking a picture of the object.

4. Business Models

To offer the image based search engine in an economic fashion we propose to apply the following business models.

The search service is offered such that a distributed server network is provided to which images can be send the symbolic information describing the objects visible on the image is send back to the querying client.

A fee may be charged per transaction, or alternatively, a fixed monthly fee may be charged for such a service. On the side of providers of new annotated images one can request a fee per entry into the database.

Features of interest:
1. Multiple engines combined
   a. Rigid objects
   b. Faces
   c. OCR
2. Database which takes multiple data items into account
3. translation services
4. adaptive image transmission
5. keeping images send in for queries to improve object representations
6. grooming representations
7. service model
8. Java applet, http protocol, jpg, pre-installed
9. learn images on the fly
10. simple scalability. Users can submit images
11. speech input to guide search
12. SIFT Features, Gabor Wavelets, viola jones cascades for Object Recognition
13. applications:
    a. bus stands
    b. print to internet
    c. antiques
    d. services technicians
    e. learning tool for children
14. load fresh images every day for newspapers
15. recognition classes: words/ads/travel guide/etc.
16. virtual notes
17. color or texture descriptors to prune search
18. Allow users to send in their own images and label them
19. search with logarithmic scaling
20. feed query answer back into a Google like search engine
21. Intelligence on the edge

We claim:

1. A method for updating object representations in an image database, the method comprising:
   receiving an image of an object from a client device associated with a user, the receiving of the image constituting a first user query for information related to the object;
   recognizing the object using an image recognition engine and an image database, the image database storing object identifiers in association with objects;
   associating, from the image database, an object identifier with the recognized object;
   transmitting to the client device associated with the user, information related to the recognized object;
   receiving an indication of whether the user accepted the transmitted information as being relevant to the object; and
   responsive to a computed confidence measure of the recognition of the object exceeding a given threshold, storing the image of the object in the image database in association with the object identifier;
   wherein the confidence measure is computed at least in part based on the indication that the user accepted the transmitted information as being relevant to the object.

2. The method of claim 1, wherein the confidence measure is computed at least based in part on an amount of time that the client device displays the transmitted information.

3. The method of claim 1, wherein the confidence measure is computed at least based in part on whether a second user query for information related to the object is received within a predetermined amount of time of the first user query.

4. The method of claim 1, further comprising identifying a web page address related to the recognized object and storing the web page address in association with the object identifier.

5. The method of claim 1, further comprising
   identifying an audio stream related to the recognized object and storing the audio stream in association with the object identifier.

6. The method of claim 1, wherein the recognized object comprises text, the method further comprising translating the text and storing the translated text in association with the object identifier.

7. The method of claim 1, wherein recognizing the object comprises at least one of: performing optical character recognition, performing object recognition, and performing facial recognition.

8. The method of claim 7, wherein performing object recognition comprises performing rigid texture object recognition.

9. The method of claim 7, wherein performing object recognition comprises performing articulate object recognition.

10. The method of claim 1, wherein the image of the object is obtained using a built-in camera of the client device.

11. A recognition computer server system for updating object representations in an image database, the recognition computer server system adapted to perform actions comprising:
   receiving an image of an object from a client device associated with a user, the receiving of the image constituting a first user query for information related to the object;
   recognizing the object using an image recognition engine and an image database, the image database storing object identifiers in association with objects;
   associating, from the image database, an object identifier with the recognized object;
   transmitting to the client device associated with the user, information related to the recognized object;
   receiving an indication of whether the user accepted the transmitted information as being relevant to the object; and
   responsive to a computed confidence measure of the recognition of the object exceeding a given threshold, storing the image of the object in the image database in association with the object identifier;
   wherein the confidence measure is computed at least in part based on the indication that the user accepted the transmitted information as being relevant to the object.

12. The recognition computer server system of claim 11, wherein the confidence measure is computed at least based in part on an amount of time that the client device displays the transmitted information.

13. The recognition computer server system of claim 11, wherein the confidence measure is computed at least based in part on whether a second user query for information related to the object is received within a predetermined amount of time of the first user query.

14. The recognition computer server system of claim 11, the actions of the recognition computer server system further comprising identifying a web page address related to the recognized object and storing the web page address in association with the object identifier.

15. The recognition computer server system of claim 11, the actions of the recognition computer server system further comprising identifying an audio stream related to the recognized object and storing the audio stream in association with the object identifier.

16. The recognition computer server system of claim 11, wherein the recognized object comprises text, the method further comprising translating the text and storing the translated text in association with the object identifier.

17. The recognition computer server system of claim 11, wherein recognizing the object comprises at least one of: performing optical character recognition, performing object recognition, and performing facial recognition.

18. The recognition computer server system of claim 17, wherein performing object recognition comprises performing rigid texture object recognition.

19. The recognition computer server system of claim 17, wherein performing object recognition comprises performing articulate object recognition.

20. The recognition computer server system of claim 11, wherein the image of the object is obtained using a built-in camera of the client device.

* * * * *